United States Patent [19]

Mishima et al.

[11] 4,397,666
[45] Aug. 9, 1983

[54] METHOD OF PRODUCING GLASS FROM METAL ALKOXIDE SOLUTION

[75] Inventors: Michiharu Mishima; Yuji Yamamoto; Kensuke Makita, all of Matsuzaka; Sumio Sakka, Tsu; Kanichi Kamiya, Mie, all of Japan

[73] Assignee: Central Glass Company Limited, Ube, Japan

[21] Appl. No.: 315,494

[22] Filed: Oct. 27, 1981

[30] Foreign Application Priority Data

Oct. 30, 1980 [JP] Japan ................... 55-151347

[51] Int. Cl.³ .................. C03B 19/06; C03B 20/00
[52] U.S. Cl. ......................... 65/18.3; 65/17; 65/18.1; 501/12; 264/301
[58] Field of Search .................. 501/12, 35, 54; 264/215, 216, 176 R, 164, 211, 301; 65/17, 18.3, 18.1, 134, 90; 423/338

[56] References Cited

U.S. PATENT DOCUMENTS

| 2,883,296 | 4/1959 | Labino | 501/35 |
| 3,183,104 | 5/1965 | Thomas | 501/35 |
| 3,597,252 | 8/1971 | Schroder et al. | 65/17 X |
| 3,681,113 | 8/1972 | Yoldas | 65/324 X |
| 3,767,434 | 10/1973 | Thomas | 501/12 |
| 3,808,302 | 4/1974 | Dyer et al. | 264/211 |
| 3,847,583 | 11/1974 | Dislich et al. | 501/12 X |
| 4,205,030 | 5/1980 | Menshutin et al. | 264/211 X |
| 4,278,632 | 7/1981 | Yoldas | 264/66 |

FOREIGN PATENT DOCUMENTS 595803 4/1960 Canada ................... 501/12

Primary Examiner—Kenneth M. Schor
Attorney, Agent, or Firm—Fleit, Jacobson & Cohn

[57] ABSTRACT

In producing silica glass, which may contain additional metal(s) such as Ti or Zr, from a solution of a silicon alkoxide, mixed with alkoxide(s) of the additional metal(s) where necessary, in water and a hydrophilic organic solvent by shaping the solution into a desired form such as a coating film on a substrate, self-supporting film, fiber or lump when the solution exhibits a suitably high viscosity and sufficiently heating the shaped solution, a water-soluble organic polymeric substance is added to the solution as a viscosity adjusting agent to soon increase the viscosity of the solution to the desirable level. Therefore, shaping of the solution can be performed without awaiting the progress of hydrolysis of the alkoxide in the solution, and the glass can be obtained with improved uniformity of its properties. A cellulose ether is preferred as the viscosity adjusting agent, and hydroxypropyl cellulose is particularly preferable.

20 Claims, 1 Drawing Figure

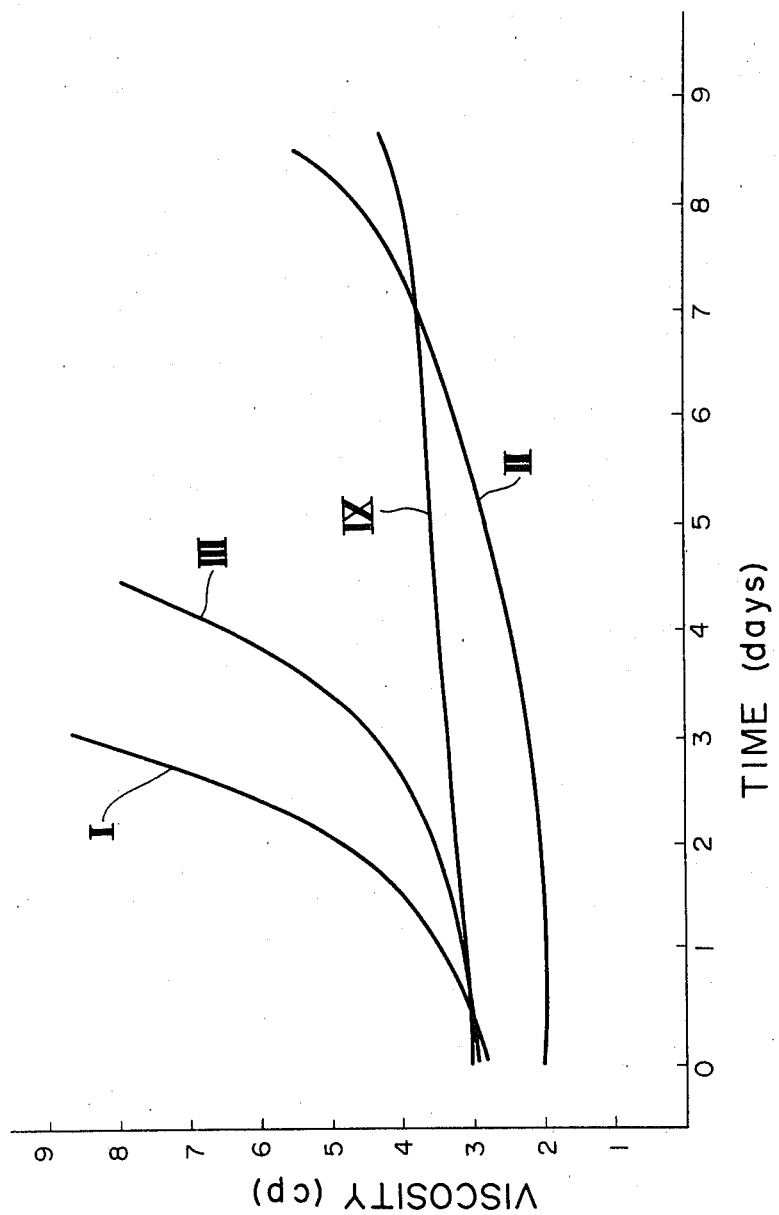

METHOD OF PRODUCING GLASS FROM METAL ALKOXIDE SOLUTION

BACKGROUND OF THE INVENTION

This invention relates to a method of producing either practically pure silica glass or a modified silica glass containing at least one metal other than silicon by using a silicon alkoxide solution, which may contain additional alkoxide(s) of the desired metal(s) to produce a modified silica glass.

Recently, it has attracted increasing attention to produce silica glass or a "modified silica glass," which contains in the glass matrix at least one metal other than silicon as exemplified by titanium-containing silica glass, without melting or fusing raw materials by using a silicon alkoxide solution or a mixed alkoxide solution containing a silicon alkoxide and at least one additional metal alkoxide. (In the following description, the term "metal alkoxide solution" means either a solution of silicon alkoxide or the aforementioned mixed alkoxide solution.)

In principle, a glass producing method of this type consists of the steps of first preparing a metal alkoxide solution which contains an organic solvent in addition to water, then allowing the metal alkoxide(s) in the solution to hydrolyze to increase the viscosity of the solution until gelation of the solution, and finally heating the gelled material to convert it into glass. In practice, there is the need of shaping the metal alkoxide solution into a desired form, i.e. intended form of the glass to be produced, such as a coating film on a solid body, independent film, fiber or lump at an intermediate stage of the aforementioned hydrolysis step while the solution exhibits a sufficiently high viscosity but has not yet gelled. As will be understood, a suitable viscosity of the metal alkoxide solution to carry out the solution-shaping operation is variable depending on the type of the shaping method, and in every case the shaping operation can successfully be carried out only in a relatively narrow range of the viscosity values of the solution. The viscosity of a metal alkoxide solution and the rate of its increase considerably vary depending on various factors such as the kind of the metal alkoxide, amount of the organic solvent and the rate of progress of the hydrolysis of the alkoxide. In general the viscosity of each metal alkoxide solution becomes higher as the amount of the organic solvent is decreased and as the hydrolysis of the alkoxide progresses. However, it is difficult to freely vary the amount of the organic solvent which is employed for the purpose of assisting the dissolution of the metal alkoxide and enhancing the miscibility of the metal alkoxide with water, and the rate of hydrolysis is determined fundamentally by the kind of the metal alkoxide. Since silicon alkoxides are generally low in the rate of hydrolysis, it takes a very long time such as several days for a metal alkoxide solution to reach a viscosity suited to the shaping operation.

In the described glass producing method, it is also a matter for consideration that the degree of hydrolysis of the alkoxide in the solution at the time of the shaping operation affects the manner of gelation of the shaped viscous solution and the properties of the glass obtained through a subsequent heating process. Until now, however, no technique has yet been proposed to control the viscosity of a metal alkoxide solution independently of the rate or degree of hydrolysis of the metal alkoxide in the solution.

A more detailed description will be given with respect to the case of forming a glass coating film on a glass or ceramic substrate, or a surface of a solid body or any other form, by using a metal alkoxide solution. Coating of various substrates with glass film by this method is expected to have much application for the purpose of enhancing the chemical resistance and scratch resistance of the substrates and/or modifying the electrical characteristic or optical property of the substrate.

In this case the aforementioned shaping of a metal alkoxide solution is embodied in coating of a substrate with a film of the alkoxide solution which has become adequately viscous. More particularly, the coating is achieved by immersing the substrate in the metal alkoxide solution not yet gelled and withdrawing therefrom or by spraying the alkoxide solution onto a major surface of the substrate, or still alternatively by dropping the solution onto the surface of the substrate and swiftly rotating the substrate in a horizontal plane. In every case the thickness of the liquid film and, hence, the thickness of the glass coating film formed by this method depend primarily on the viscosity of the metal alkoxide solution.

To fully achieve the object of this coating technique, it is important to form a glass coating film which is uniform and high in the strength of its adhesion to the substrate surface and has a sufficient thickness, though this film is a very thin film usually less than one micron in thickness. For example, in the case of a colored glass coating film with the desire of a deep color, it becomes necessary to form the coating film to a considerably large thickness because it is impossible to freely increase the content of the coloring element in the metal alkoxide solution without failing to form a uniform glass coating film. As a different example, where the glass film coating technique is applied to a substrate that is rather inferior in its surface smoothness it is desirable that the glass coating film has sufficient thickness to ensure effectiveness of the coating over the entire surface area and ensure durability of the coating film. Therefore, it becomes necessary to perform the aforementioned step of forming a liquid film on the substrate when the metal alkoxide solution exhibits sufficiently high viscosity. Since the composition of the metal alkoxide solution must be determined principally in view of the chemical composition of the intended glass coating film rather than the viscosity of the solution, a sufficient increase in the viscosity of the solution should necessarily be achieved by allowing the hydrolysis of the metal alkoxide in the solution to proceed to considerable extent before coating of the substrate with this solution. In other words, it will be necessary to carry out the coating operation when the metal alkoxide solution is in a highly viscous state shortly before gelation of the solution. By using a metal alkoxide solution after the progress of the hydrolysis to such extent, certainly it is possible to coat the substrate with a relatively thick liquid film which can be expected to give a glass coating film of a sufficiently large thickness. Actually, however, heating of the liquid film formed in this way results in significant peeling and/or cracking of the resultant glass coating film and therefore fails to give a uniform coating film of glass on the surface of the substrate.

Thus, it is a matter of great inconvenience in the known methods of producing glass from a metal alkoxide solution that the viscosity of the solution can hardly be controlled independently of the progress of the hydrolysis of the metal alkoxide in the solution.

SUMMARY OF THE INVENTION

It is an object of the present invention to provide an improved method of producing glass from a metal alkoxide solution, in which method the viscosity of the alkoxide solution can desirably be controlled independently of the extent of hydrolysis of the alkoxide in the solution.

The present invention provides a method of producing glass from a solution comprising a silicon alkoxide, water and a hydrophilic organic solvent, which method has the steps of shaping the solution into a desired form when the solution exhibits an appropriate viscosity and heating the shaped solution to a temperature sufficient to convert the shaped solution into a glass of the desired form. As the improvement according to the invention, this method includes the step of adding a water-soluble organic polymeric substance to the aforementioned solution as a viscosity adjusting agent to cause the resultant solution to exhibit the appropriate viscosity.

It is preferred to use a cellulose ether soluble in both water and lower alcohol as the viscosity adjusting agent, and hydroxypropyl cellulose is the most preferred example.

By the addition of the viscosity adjusting agent according to the invention at the stage of preparing the metal alkoxide solution, the viscosity of the solution can almost instantly be increased to a desired level independently of the progress of hydrolysis of the metal alkoxide in the solution. Accordingly the shaping of the solution into a desired form such as film, fiber or lump can be performed without awaiting progress of the hydrolysis. Therefore, the method of the invention can be performed with greatly improved productivity. Moreover, the glass produced by this method is superior in uniformity of its properties to a corresponding glass produced by hitherto proposed methods in which the viscosity of a metal alkoxide solution is increased by hydrolysis of the metal alkoxide in the solution.

In the case of forming a glass coating film on a substrate or a solid body or any other form by the method of the invention, it is possible to easily and widely control the thickness of the coating film by simply controlling the amount of the viscosity adjusting agent, and the glass coating film can be formed at relatively low temperatures with excellent uniformity in its chemical and physical properties and high strength of adhesion to the substrate surface. Accordingly, the intended purposes of the coating such as enhancement of chemical resistance and/or mechanical strength and/or modification of electrical or optical properties can fully be accomplished.

Also when producing glass in the form of independent and self-supporting film, fiber, lump or grain, the method of the invention is advantageous in the ease of production and good properties of the produced glass.

Either a practically pure silica glass or a modified silica glass containing in the glass matrix at least one metal other than silicon can be produced by the method of the invention. In the latter case, the silicon alkoxide solution contains at least one additional metal alkoxide such as titanium tetraisopropoxide or zirconium tetrapropoxide for instance.

BRIEF DESCRIPTION OF THE DRAWING

The single FIGURE is a graph showing changes in the viscosity of experimentally prepared metal alkoxide solutions with the lapse of time.

DESCRIPTION OF THE PREFERRED EMBODIMENTS

Preferred examples of silicon alkoxides useful in the method of the invention are silicon tetramethoxide $Si(OCH_3)_4$ (commonly called methyl silicate) and silicon tetraethoxide $Si(OC_2H_5)_4$ (commonly called ethyl silicate).

In the case of using a mixed alkoxide solution containing at least one additional metal alkoxide other than silicon alkoxide, the additional metal alkoxide(s) is usually selected from titanium alkoxides, zirconium alkoxides and aluminum alkoxides. Typical examples are titanium tetraisopropoxide which can be expressed by $Ti(OisoC_3H_7)_4$ and zirconium tetrapropoxide $Zr(OC_3H_7)_4 \cdot 2C_3H_7OH$. Titanium is introduced into silica glass mainly for improvement of heat resistance and zirconium for improvement of resistance to chemicals. In most cases it is suitable that the mole ratio of the silicon alkoxide to the additional metal alkoxide(s) in the alkoxide solution is not smaller than 0.3:1.

Water is indispensable to the alkoxide solution in the method of the invention since it is necessary to cause the alkoxide(s) in the solution to undergo hydrolysis. Though not limitative, it is desirable that the mole ratio of water to the total alkoxide in the solution be in the range from about 1:1 to about 20:1.

The organic solvent is used to assist dissolution of the alkoxide(s) to thereby enhance miscibility of the alkoxide(s) with water and also to prevent the occurrence of nonuniform gelation of the alkoxide solution by excessively rapid reaction between the alkoxide(s) and water. Although various solvents are of use and there is no particular restriction on the selection, usually it is suitable to use a lower alcohol such as methanol, ethanol, propanol or butanol. As to the amount of the organic solvent, usually it is suitable that the mole ratio of the solvent to the total alkoxide in the solution is in the range from about 3:1 to about 10:1. In general, the viscosity of the alkoxide solution becomes lower as the amount of the organic solvent is increased. Therefore, in the case of coating a substrate with a glass film by the method of the invention, the thickness of the coating film decreases as the amount organic solvent is increased. On the other hand, the transparency of the coating film increases when the alkoxide solution contains relatively large amount of organic solvent, such as 40% by weight or more. Accordingly, the amount of the organic solvent would be determined in consideration of such tendencies of the thickness and transparency of the intended glass film.

Most of silicon alkoxides useful in the present invention, including silicon tetramethoxide and silicon tetraethoxide, are rather low in their reactivity with water and therefore do not readily undergo hydrolysis when merely brought into contact with water. Therefore, in the case of using a silicon alkoxide alone (without using any other metal alkoxide) in the method of the invention there is the need of adding an acid to the alkoxide solution as a hydrolysis catalyst. It is preferable to use a relatively readily volatile acid such as nitric acid, hydrochloric acid or acetic acid, and usually it is sufficient that the acid amounts to about 3% by mole of the silicon alkoxide. In contrast, metal alkoxides other than silicon alkoxide do hydrolyze so readily and relatively rapidly that, in a mixed alkoxide solution in the present invention, hydrolysis of the silicon alkoxide in the solution accompanies the hydrolysis of the other metal alkoxide. Therefore, it is unnecessary to add an acid catalyst to the mixed alkoxide solution. Moreover, in the case of a mixed alkoxide solution containing a titanium alkoxide such as titanium tetraisopropoxide, care should be taken to prevent rapid gelation of the solution attributed to very high tendency of the titanium alkoxide to hydrolysis.

As the viscosity adjusting agent according to the invention, it is recommended to use a water-soluble cellulose ether as mentioned hereinbefore because of its good stability and high viscosity-increasing effect. Preferred examples are hydroxypropyl cellulose, hydroxyethyl cellulose, hydroxypropylmethyl cellulose, methyl cellulose and ethyl cellulose. Preferred the best one is hydroxypropyl cellulose because this substance is highly soluble in water and in various organic solvents and is exceedingly high in its viscosity-increasing effect in an alkoxide solution.

A suitable amount of the viscosity adjusting agent differs with the compositions of the alkoxide solution and the viscosity adjusting agent. In general, it is desirable to use such an amount of viscosity adjusting agent that the resultant alkoxide solution exhibits a viscosity value in the range from about 5 to about 30 centipoises (cp) at room temperature. Where it is intended to form a glass film on the surface of a substrate by using the alkoxide solution, it is preferable that the viscosity of the solution after the addition of the viscosity adjusting agent is in the range from 7 to 25 cp at room temperature. If the viscosity is below 7 cp it is difficult to obtain a sufficiently thick glass film and accordingly the addition of the viscosity adjusting agent becomes almost meaningless. However, the use of an alkoxide solution having a viscosity higher than 25 cp often results in cracking of the glass film formed on the substrate surface, although the film can be made sufficiently thick, because shrinkage of the unsolidified coating film during the final heating process tends to occur at different rates and to different degrees between the exposed outer side of the film and the opposite side contacting the substrate surface.

In contrast, it takes about 3 days or longer for a metal alkoxide solution not containing any viscosity adjusting agent to reach a viscosity of about 10 cp, though the length of time depends on the composition of the solution. Of course this is quite unfavorable for the efficiency of the glass production process. Also, it is a disadvantage for the hydrolysis of the alkoxide(s) in this solution to proceed to considerable extent before the viscosity reaches a sufficiently high level such as 10 cp, because a liquid film formed by applying this solution to a substrate is liable to gel too soon so that cracking or peeling of the film during the final firing process is almost inevitable. To prevent cracking and peeling of the glass coating film, it becomes necessary to apply the alkoxide solution (not containing viscosity adjusting agent) to the substrate while the viscosity of the solution is as low as about 3 cp, and therefore it becomes impossible to form a glass coating film thicker than about 0.2 $\mu$m.

In addition to the above described constituents of an alkoxide solution according to the invention, it is optional to add at least one auxiliary additive to the solution with the purpose of affording certain property or properties to the glass produced from this solution. For example, a transition element such as Fe, Co, Ni or Cu in the form of a suitable salt such as a nitrate may be added to the solution as a coloring element. Of course such optional additives are required to be soluble in water and the organic solvent employed for preparation of the alkoxide solution.

In preparing an alkoxide solution according to the invention, there is no strict restriction on the sequence of addition and mixing of the constitutents. In the case of an alkoxide solution not containing any metal alkoxide other than silicon alkoxide, it is recommended to first mix the silicon alkoxide well with water and organic solvent by sufficient stirring and then add a mixed solution containing water, organic solvent and an acid catalyst to the initially prepared mixture, and finally add an organic polymer selected as the viscosity adjusting agent. To facilitate uniform distribution of the organic polymer in the alkoxide solution, it is preferred to use the organic polymer in the form of about 1 to 3% solution in an alcohol. In the case of a mixed alkoxide solution containing a metal alkoxide high in reactivity with water, it becomes necessary to mix the silicon alkoxide well with the other metal alkoxide in advance of the introduction of water and organic solvent. Also in this case, a viscosity adjusting agent is added to the solution at the final stage of preparation of the solution.

As the viscosity of the alkoxide solution increases to a sufficient level by the addition of the viscosity adjusting agent, it is possible to perform the next step of forming a film, or a differently shaped mass, of a viscous liquid without awaiting progress of the hydrolysis of the alkoxide(s) in the solution. For example, a viscous liquid film can be formed on the surface of a glass, ceramic or metal substrate, or a body of any other form, by wetting the substrate surface with the alkoxide solution by a suitable method such as immersion of the substrate in the solution soon after the addition of the viscosity adjusting agent to the solution. The liquid film on the substrate surface is dried and then heated to a temperature sufficient to convert the liquid film into a glass film. It is also possible to omit the drying step so as to successively achieve drying of the liquid film and conversion of the dried film into a glass film by a single heating process. The drying and heating conditions are so determined as to facilitate evaporation of the water and organic solvent contained in the liquid film without causing significantly nonuniform shrinkage of the film, and also taking into consideration other factors including heat resistance of the substrate. By using an alkoxide solution according to the invention in such a coating process it is possible to surely form a glass coating film having a thickness usually in the range from about 0.3 $\mu$m to about 1 $\mu$m without suffering from cracking or peeling of the coating film. Where a thicker coating film is desired, the desire can be met by repeating the above described coating process. Needless to mention, the wetting of the substrate with the alkoxide solution may alternatively be accomplished by spraying the solution on the substrate or by dropping the solution onto the substrate and rotating the substrate at a high rate, or by any one of other known techniques for forming a liquid film on a solid surface.

The application of the present invention is not limited to coating of a substrate with a glass film or formation of a glass film on a solid surface. In every case of producing a silica base glass in the form of coating film, independent film, fiber or lump from a viscous solution containing a silicon alkoxide, the use of a viscosity adjusting agent according to the invention leads to improved efficiency of the production and improved quality of the obtained glass.

The following examples illustrate the application of the method according to the invention to the production of silica base glass film on glass or ceramic substrates, but needless to mention these examples are by no means limitative.

EXAMPLE 1

First, 15 g of silicon tetraethoxide was well mixed with 13 g of aqueous ethanol (95% ethanol) at room temperature, and then 2.6 g of water, 0.6 g of hydrochloric acid (35% HCl) and 10 g of 2% solution of hydroxypropyl cellulose in ethanol were added to the silicon tetraethoxide solution with sufficient stirring to obtain a mixed solution in which all the constituents were uniformly mixed. This solution contained 52.6% by weight of ethanol and had a viscosity of 24.2 cp at room temperature.

A glass plate (76 mm×26 mm wide) sold as object glass for microscopic observation was used as a substrate in this example. The glass substrate was immersed in the mixed solution and soon, but slowly, withdrawn from the solution by pulling up the substrate at a rate of 1.5 mm/sec. The wetted substrate was dried at 120° C. for 3 min to allow evaporation of ethanol and water. After that the substrate was heated in an oven maintained at 500° C. for 20 min and thereafter left to naturally cool in the atmosphere.

It was confirmed that the thus treated substrate was coated with a thin film of silica glass which was high in transparency. Neither cracking nor peeling was observed in any region of this coating film, and the thickness of this film was measured to be 0.5 μm.

COMPARATIVE EXPERIMENT 1

A silicon tetraethoxide solution was prepared generally in accordance with the procedure of preparing the mixed solution in Example 1 except that the addition of the hydroxypropyl cellulose solution was omitted. That is, no viscosity adjusting agent was used in this experiment. This solution was far lower in viscosity than the solution prepared in Example 1. For three days this solution was left standing in the atmosphere at room temperature to examine the manner of increase in the viscosity with time. The result is represented by the curve I in the single FIGURE of the accompanying drawing. After the lapse of 24 hours from preparation, the viscosity of the solution at room temperature was measured to be 3.2 cp, and at this stage it was tried to form a silica glass film on the glass substrate mentioned in Example 1 by immersing the substrate in the low viscosity solution, drying the wetted substrate and heating the dried substrate in the same manner as in Example 1. As the result the substrate was coated with a silica glass film the thickness of which was measured to be 0.25 μm, but many cracks had appeared on the surface of this coating film.

EXAMPLE 2

With this invention of producing a glass composition expressed by $2TiO_2.98SiO_2$, 15 g of silicon tetraethoxide and 0.43 g of titanium tetraisopropoxide were mixed with each other by continuing stirring for one hour, and, still continuing stirring, aqueous ethanol (95% ethanol) was added to the mixture drop by drop by using a burette. After the addition of 10 g of the aqueous ethanol it was possible to increase the rate of addition without causing the solution to become opaque. In total, 23.2 g of the aqueous ethanol was added to the alkoxide mixture. After that, a mixture of 14.5 g of water and 10 g of 2% solution of hydroxypropyl cellulose in ethanol was slowly added to the alkoxide solution with continued stirring. The solution prepared in this way was uniformly clear and transparent and colored in pale yellow. This solution contained 49.7% by weight of ethanol and exhibited a viscosity value of 20.8 cp at room temperature.

The glass substrate mentioned in Example 1 was immersed in this solution and soon, but slowly, withdrawn from the solution by pulling up the substrate at a rate of 1.5 mm/sec. The wetted substrate was dried at room temperature and thereafter heated in an oven maintained at 500° C. for 30 min and then left naturally cool down in the atmosphere.

It was confirmed that the thus treated substrate was coated with a silica-titania glass film having a thickness of 0.5 μm. Neither cracking nor peeling was observed in any region of this coating film.

COMPARATIVE EXPERIMENT 2

A mixed alkoxide solution was prepared by repeating the procedure in Example 2 except that the addition of the hydroxypropyl cellulose solution was omitted. The solution obtained in this experiment was far lower in viscosity than the solution prepared in Example 2. This solution was left standing in the atmosphere at room temperature for more than 8 days to examine the manner of increase in the viscosity with time. The result is represented by the curve II in the FIGURE. After the lapse of 7 days from preparation, the viscosity of the solution at room temperature was 3.3 cp, and at this stage the coating procedure of Example 2 was carried out by using this low viscosity solution. As the result the glass substrate was coated with a silica-titania glass film having a thickness of 0.3 μm, but many cracks had appeared on the surface of this coating film.

EXAMPLE 3

With the intention of producing a glass composition expressed by $1.7TiO_2.78.3SiO_2.20CuO$, first 15 g of silicon tetraethoxide and 0.43 g of titanium tetraisopropoxide were mixed with each other followed by the addition of 23.2 g of aqueous ethanol (95% ethanol) to the alkoxide mixture by the same method as in Example 2, and thereafter a mixed solution of 14.45 g of water, 4.45 g of $Cu(NO_3)_2.3H_2O$ and 10 g of 2% solution of hydroxypropyl cellulose in ethanol was slowly added to the alkoxide solution with continued stirring. The solution prepared in this way was uniformly clear and transparent and colored in light green. This solution contained 46.4% by weight of ethanol and exhibited a viscosity value of 20.9 cp at room temperature.

The glass substrate mentioned in Example 1 was immersed in the mixed solution and soon, but slowly, withdrawn from the solution by pulling up the substrate at a rate of 1.5 mm/sec. The wetted substrate was dried at 120° C. for 3 min and thereafter heated in an oven at 500° C. for 40 min, and then let naturally cool down in the atmosphere.

As the result the substrate was coated with a glass film, which was uniformly transparent and colored in light green and did not exhibit any cracks or peeling.

The thickness of the coating film was measured to be 0.5 μm.

COMPARATIVE EXPERIMENT 3

A mixed solution was prepared by repeating the solution-preparing procedure in Example 3 except that the hydroxypropyl cellulose solution was not used. This solution was far lower in viscosity than the solution prepared in Example 3 and was left standing in the atmosphere at room temperature for more than 4 days to examine the manner of increase in the viscosity with time. The result is represented by the curve III in the FIGURE. After the lapse of 2 days from the preparation, the viscosity of the solution was 3.5 cp, and at this stage the coating procedure of Example 3 was carried out by using this low viscosity solution. As the result the substrate was coated with a glass film having a thickness of 0.3 μm, but this coating film was inferior in its adhesion to the surface of the substrate and in some areas had peeled from the substrate.

EXAMPLE 4

To produce a glass composition expressed by 98SiO$_2$.2ZrO$_2$, 15 g of silicon tetraethoxide and 0.66 g of 95% solution of zirconium tetrapropoxide in propanol were well mixed by continuing stirring for one hour, and 22.0 g of aqueous ethanol (95% ethanol) was slowly and carefully added to the alkoxide mixture by the same method as in Examples 2 and 3. After that 13.75 g of water and 10 g of 1% solution of hydroxypropyl cellulose in ethanol were slowly added to the mixed alkoxide solution. The resultant solution exhibited a viscosity value of 9.2 cp at room temperature.

The glass substrate mentioned in Example 1 was immersed in this solution and soon, but slowly, withdrawn from the solution by pulling up the substrate at a rate of 1.5 mm/sec. The wetted substrate was dried at 100° C. for 3 min and then heated in an oven maintained at 500° C. for 1 hr, and thereafter left to naturally cool down in the atmosphere.

A glass coating film formed on the substrate by this process was somewhat cloudy and relatively low in its transparency, but this coating film was uniform over the entire area and did not exhibit any cracks or peeling. The thickness of this film was 0.6 μm.

COMPARATIVE EXPERIMENT 4

A mixed alkoxide solution was prepared by repeating the solution-preparing procedure in Example 4 except that the hydroxypropyl cellulose solution was not used. This solution was left standing in the atmosphere at room temperature for more than 8 days to examine the manner of increase in the viscosity with time. The result is represented by the curve IV in the FIGURE. As can be seen, the viscosity of this solution increased only very slightly and very slowly. After the lapse of 4 days from the preparation, the viscosity of the solution was 3.3 cp, and at this stage the coating procedure of Example 4 was carried out by using this low viscosity solution. As the result the substrate was coated with a glass film having a thickness of 0.3 μm, but many cracks had appeared on the surface of this coating film.

EXAMPLE 5

A solution of silicon tetraethoxide was prepared generally in accordance with Example 1. As a sole modification, 10 g of 1% solution of hydroxypropyl cellulose in ethanol was used in place of the 2% solution used in Example 1. Therefore, the content of ethanol in the resultant solution was 52.8% by weight. The viscosity of this solution was 11.5 cp at room temperature.

An alumina substrate (40 mm × 30 mm wide) for integrated circuits was immersed in the solution and soon, but slowly, withdrawn from the solution by pulling up the substrate at a rate of 1.5 mm/sec. The wetted substrate was heated in an oven maintained at 200° C. for 10 min and thereafter left to cool down in the atmosphere. It was confirmed that the thus treated alumina substrate was coated with a silica glass film which was uniform and high in transparency and did not exhibit any cracks or peeling. The thickness of this silica glass film was 0.5 μm.

What is claimed is:

1. In a method of producing glass from a solution comprising a silicon alkoxide, water and a hydrophilic organic solvent, wherein the silicon alkoxide in the solution undergoes hydrolysis so that the viscosity of the solution gradually increases; the method comprising the steps of shaping the material of said solution into a desired form when said solution exhibits an appropriate viscosity for shaping wherein the gelled shaped solution material undergoes gelation, and heating the gelled shaped solution to a temperature sufficient to convert the shaped solution into a glass of the desired form;

the improvement comprising the step of adding a water-soluble cellulose ether selected from the group consisting of hydroxypropyl cellulose, hydroxyethyl cellulose, hydroxypropylmethyl cellulose, methyl cellulose and ethyl cellulose to said solution as a viscosity increasing agent in an amount effective to increase the viscosity of the solution to from 5 to 30 centipoises at room temperature, the increase in viscosity being effected substantially independently of the progress of said hydrolysis, wherein the shaping of the solution is performed when the viscosity reaches the viscosity for shaping without awaiting the progress of said hydrolysis to effect a shaping viscosity.

2. A method according to claim 1, wherein said cellulose ether is added to said solution in the form of solution in an alcohol.

3. A method according to claim 1, wherein said silicon alkoxide is a sole alkoxide contained in said solution so that said glass is a practically pure silica glass.

4. A method according to claim 3, wherein said solution further comprises an acid which serves as a catalyst for hydrolysis of said alkoxide.

5. A method according to claim 4, wherein said acid is selected from the group consisting of nitric acid, hydrochloric acid and acetic acid.

6. A method according to claim 1, wherein said solution further comprises at least one additional metal alkoxide other than silicon alkoxide so that said glass is a modified silica glass containing in the glass matrix at least one metal other than silicon.

7. A method according to claim 3 or 6, wherein said silicon alkoxide is selected from the group consisting of silicon methoxide and silicon ethoxide.

8. A method according to claim 6, wherein said additional metal alkoxide is selected from the group consisting of titanium tetraisopropoxide and zirconium propoxide.

9. A method according to claim 3 or 6, wherein the mole ratio of said water to the total metal alkoxide in said solution is in the range from 1:1 to 20:1.

10. A method according to claim 9, wherein said organic solvent is a lower alcohol.

11. A method according to claim 10, wherein the mole ratio of said organic solvent to the total metal alkoxide in said solution is in the range from 3:1 to 10:1.

12. A method according to claim 1, wherein the step of shaping said solution into a desired form is accomplished by coating a surface of a solid body with said solution so that said glass is produced in the form of a coating film on said surface.

13. A method according to claim 12, wherein the amount of said viscosity adjusting agent is such that said appropriate viscosity is in the range from 7 to 25 centipoises at room temperature.

14. A method according to claim 12, wherein the coating of said surface with said solution is accomplished by immersing said solid body into said solution and withdrawing the wetted solid body from said solution.

15. A method according to claim 12, wherein said solid body is a glass body.

16. A method according to claim 12, wherein said solid body is a ceramic body.

17. A method according to claim 12, wherein the coating of said surface with said solution is accomplished by applying said solution to said surface.

18. A method according to claim 12, wherein the thickness of said coating film is in the range from 0.3 to 1.0 microns.

19. A method according to claim 1 or 12, wherein said cellulose ether is added to said solution at the stage of preparing said solution.

20. A method according to claim 1, wherein said solution contains a water-soluble salt of a transition element as a coloring agent.

* * * * *